No. 722,829. PATENTED MAR. 17, 1903.
ANTONIO FERNANDEZ Y FERNANDEZ.
CIGARETTE MAKING MACHINE.
APPLICATION FILED DEC. 2, 1901.
NO MODEL. 12 SHEETS—SHEET 1.

No. 722,829. PATENTED MAR. 17, 1903.
ANTONIO FERNANDEZ Y FERNANDEZ.
CIGARETTE MAKING MACHINE.
APPLICATION FILED DEC. 2, 1901.
NO MODEL. 12 SHEETS—SHEET 5.

No. 722,829. PATENTED MAR. 17, 1903.
ANTONIO FERNANDEZ Y FERNANDEZ.
CIGARETTE MAKING MACHINE.
APPLICATION FILED DEC. 2, 1901.
NO MODEL. 12 SHEETS—SHEET 6.

Witnesses
Inventor
Antonio Fernandez y Fernandez
By his Attorney

No. 722,829. PATENTED MAR. 17, 1903.
ANTONIO FERNANDEZ Y FERNANDEZ.
CIGARETTE MAKING MACHINE.
APPLICATION FILED DEC. 2, 1901.
NO MODEL. 12 SHEETS—SHEET 10.

UNITED STATES PATENT OFFICE.

ANTONIO FERNANDEZ Y FERNANDEZ, OF HAVANA, CUBA.

CIGARETTE-MAKING MACHINE.

SPECIFICATION forming part of Letters Patent No. 722,829, dated March 17, 1903.

Application filed December 2, 1901. Serial No. 84,379. (No model.)

*To all whom it may concern:*

Be it known that I, ANTONIO FERNANDEZ Y FERNANDEZ, a subject of the King of Spain, and a resident of Havana, in the Province of Havana, Cuba, have invented certain new and useful Improvements in Cigarette-Making Machines, of which the following is a specification.

This invention relates to cigarette-making machinery, and has for its object the production of cigarette-machines which are continuous in their operation, of large capacity, accessible for inspection, easily repaired, and in which direct connections transmit all motion where uniformity of action is essential.

The organization of the invention comprises a feed-conveyer leading to a single separating or picker drum, the latter operating over a hopper, at the bottom of which two forming-chains coact with a conveyer leading to a cigarette-forming tube over which is located a gumming device. Adjacent and in line with the forming-tube there is operated a severing device, and by the coöperation of the said essential elements a finished cigarette is formed from loose tobacco.

In the following description the relations of the main elements with their essential appurtenances will be first considered, after which the various parts will be described in detail, and then the mode of operation and claims will be recited.

Figs. 21 to 29 represent details of the guiding device for cigarette-tube conveyer and cigarette-wrapper.

Referring to Figs. 1 to 9, the starting-lever $d$ of the machine is fastened to the arm $d^{30}$, which bears against pins $d^{33}$ on the bar $d^{31}$ of the belt-shifter $d^{32}$ of the tight and loose pulleys $d'$ $d^2$, carried on the main driving-shaft B B, which turns in bearings $b'$ to $b^4$. A bevel-gear $b^5$ is secured to the end of the shaft B B, and it meshes with the bevel-pinion $b^6$, carried on the shaft $a^5$, the latter driving the distributing or picker drum A and the feed-conveyer X. A gear $b^7$, fixed on the shaft B B, meshes with the gear $b^8$, secured to a shaft $b^9$, which latter turns in the journal-boxes $b^{13}$ $b^{14}$, fastened to the frame of the machine. A bevel-pinion $b^{10}$, carried on a shaft $b^9$, drives the bevel-gear $b^{11}$, thereby giving motion to the horizontal end cross-shaft $b^{12}$, which turns in bearings $b^{15}$, $b^{16}$, and $b^{17}$, the said cross-shaft transmitting motion to the forming-chains and their accompanying conveyer. A gear $d^3$ on the shaft B B meshes with the gear $d^4$, the latter carrying the bevel-gear $d^5$, which transmits motion to the shaft $d^6$ through the bevel-gear $d^7$, the latter shaft operating the gumming device. A pinion $f$ on the shaft B B meshes with the spur-gear $f'$ on the shaft $f^2$, and to which is also secured the bevel-pinion $f^3$, the latter driving the shaft $f^4$ by gearing with the bevel-wheel $f^5$, by virtue of which the forming-tube conveyer $g'$ is actuated. A spur-gear $h$ on the shaft B B drives the pinions $u'$ and $u^2$, thereby turning the shaft $h'$, which, with the bevel-wheels $h^3$ $h^4$, turns the shaft $h^5$, the latter carrying the grooved wheel $h^6$, that swings the arm $h^7$. A connecting-rod $T^{12}$ connects the arm $h^7$ with the swinging frame $T^5$ of the knife-carriage T. The shaft $h^5$ also carries the disk-crank $w$, to which is journaled the connecting-rod $w^2$, which reciprocates the knife-carriage T.

Figures 10, 11, 12:
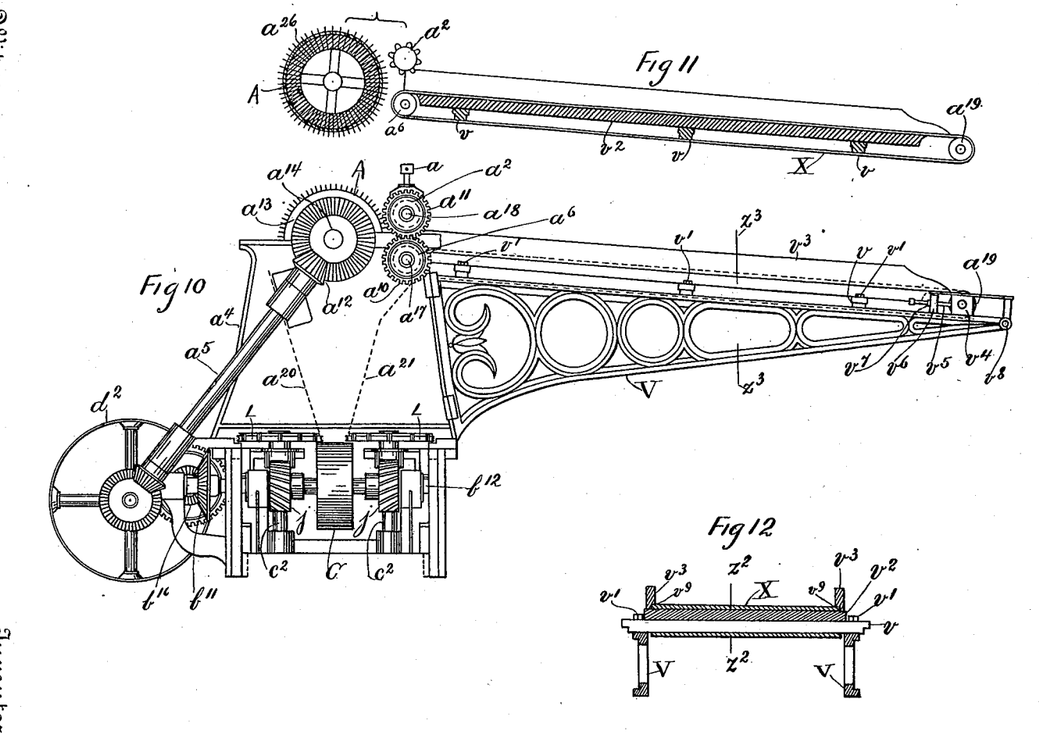
Fig. 10 is an end view of the machine adjacent to the end cross-shaft.
Fig. 11 shows a partial section of Fig 12 on a line $z^2\ z^2$, with a section through the drum and the pinching-roller, on the same plane.
Fig. 12 represents a section of Fig. 10 on the line $z^3\ z^3$.
Figure 13:
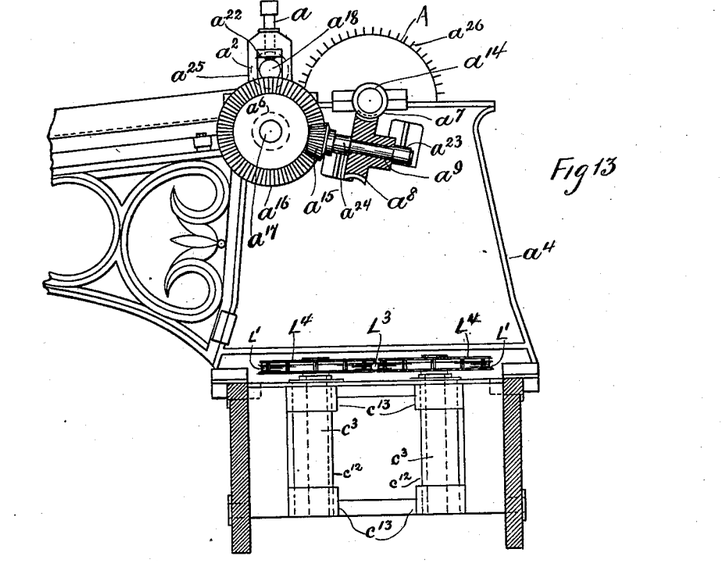
Fig. 13 is a section of Fig. 1 on the line $z^4\ z^4$.
Figure 14:
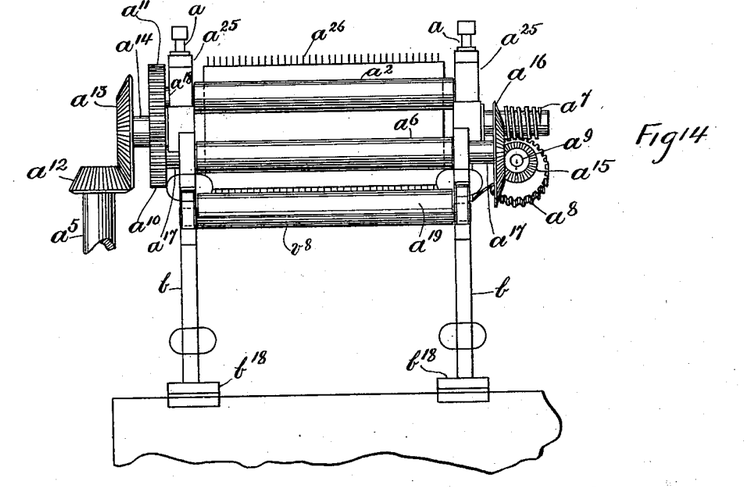
Fig. 14 shows a partial end view of the feed-apron and appurtenances.
Figure 15:
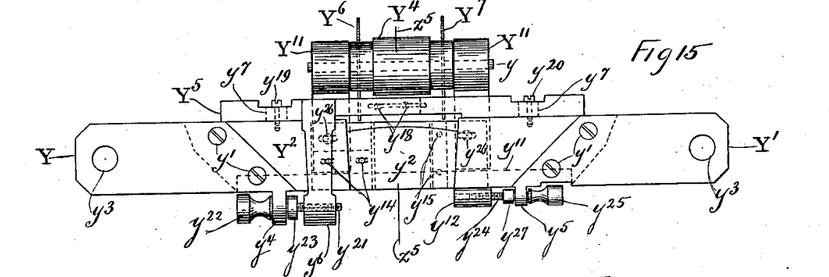
Fig. 15 represents a plan of guiding device of cigarette-tube conveyer and cigarette-wrapper.
Figure 16:
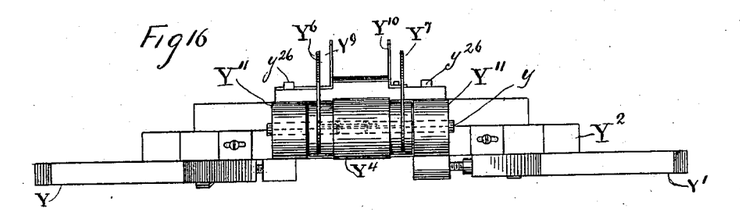
Figs. 16 and 17 show front and rear elevations of Fig. 15.
Figure 17:
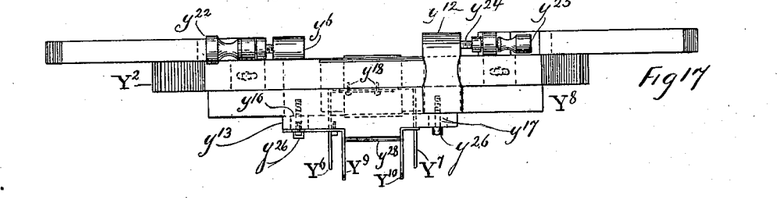
Figure 18:
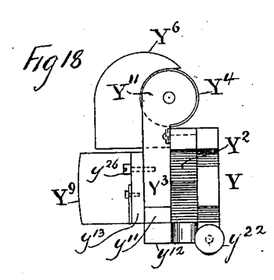
Figs. 18 and 19 are end elevations of Fig. 15.
Figure 19:
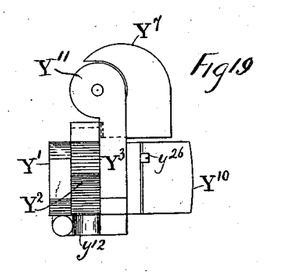
Figure 20:
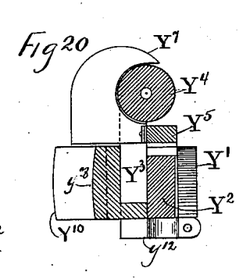
Fig. 20 is a section of Fig. 15 on the line $z^5\ z^5$.
Figures 21, 22, 23:
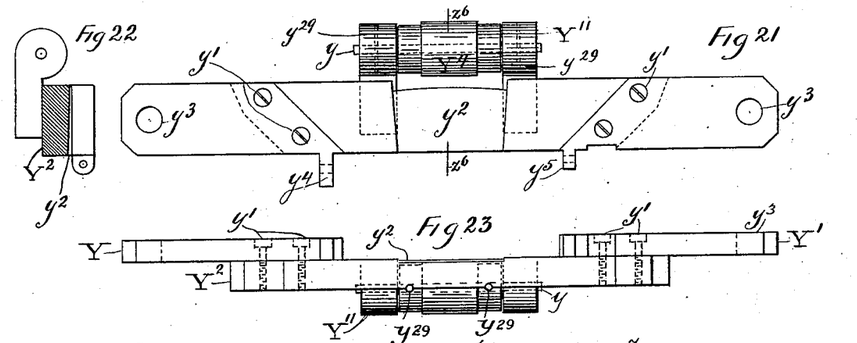
Fig. 21 is a plan of the support with its roller.
Fig. 22 shows a section of Fig. 21 on the line $z^6 z^6$.
Fig. 23 is an elevation of Fig. 21.
Figure 24:
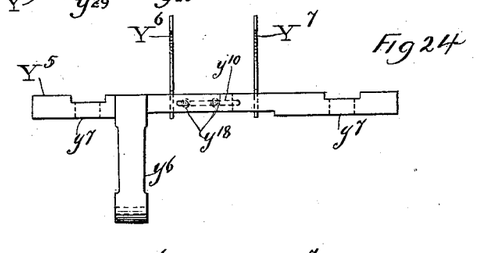
Fig. 24 represents a plan of the top sliding bar.
Figure 25:
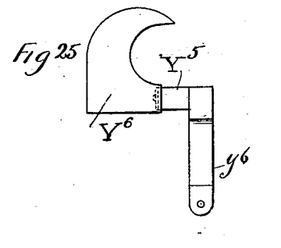
Figs. 25 and 26 are, respectively, an end view and an elevation of Fig. 24.
Figure 26:
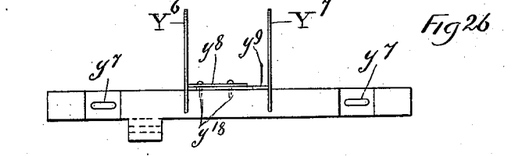
Figure 27:
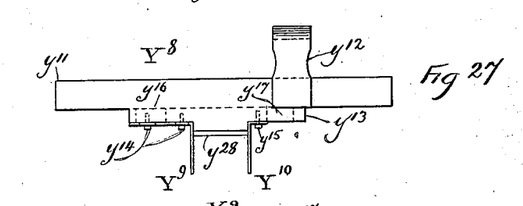
Fig. 27 is an elevation of the bottom slide.
Figure 28:
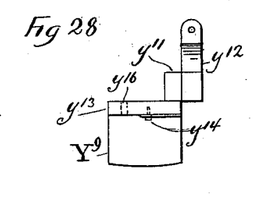

Referring now particularly to the picker or distributing drum, feed-conveyer, and their adjacent elements, (see Figs. 1, 2, and 10 to 14,) it will be noted that these elements are driven from the main shaft B B through the inclined shaft $a^5$, on which there is secured a beveled pinion $a^{12}$, which meshes with a bevel-gear $a^{13}$, secured to the shaft $a^{14}$ of the distributing or picker drum A. On the opposite end of the shaft $a^{14}$ there is formed the worm $a^7$, which meshes with the worm-wheel $a^8$, carried on the shaft $a^9$, turning in the bearings $a^{23}$ $a^{24}$. A bevel-pinion $a^{15}$ on the shaft $a^9$ drives the bevel-wheel $a^{16}$, fastened on the shaft $a^{17}$, carrying the roller $a^6$. A gear $a^{10}$ on the opposite end of the shaft $a^{17}$ meshes with a gear $a^{11}$, carried on the shaft $a^{18}$ of the feeding or pinching roller $a^2$. The roller $a^2$ is journaled in bearings $a^{22}$, which can be adjusted in the housings $a^{25}$ by the screws $a$, the ends of which bear on the said bearings, suitable gears being substituted for the gears $a^{10}$ and $a^{11}$ to allow variations in the distance between the rollers $a^2$ and $a^6$. The roller $a^2$ can have a smooth cylindrical surface, or it may be fluted, as shown in Fig. 11. Teeth $a^{26}$ extend from the surface of the distributing-drum, and the location of the drum with reference to the feed-conveyer and roller $a^2$ enable the said teeth to pick and carry the tobacco issuing from and between the roller $a^2$ and the feed-conveyer. The drum and its appurtenances are supported on legs $b$, carried on the main frame of the machine and fastened thereto by the feet $b^{18}$. The legs $b$ also constitute portions of the hopper $a^4$, to which there is fastened an apron comprising the brackets V, with cross-braces $v$ $v^8$. Bolts $v'$ secure the braces $v$ to the brackets V, and a platform $v^2$, with the sides $v^3$, is carried on the said cross-braces, the whole constituting an apron for the feed-conveyer X, which encircles the driving-roller $a^6$ and the loose roller $a^{19}$ and passes over the platform $v^2$ and in the notches $v^9$ of the sides $v^3$. The shaft of the roller $a^{19}$ turns in bearings $v^4$, adjustable on the brackets V by means of screws $v^5$, with nuts $v^7$, turning through stanchions $v^6$. The hopper is capped with a cover A', that also extends over the roller $a^2$. It contains the slanting walls $a^{20}$ $a^{21}$, which converge to direct the tobacco between the forming-chains.

I will now describe the mechanism by means of which the tobacco cord is formed, and, referring to Figs. 1 to 9, the cross-shaft $b^{12}$ carries the spiral gears $j$, which mesh with the spiral gears $j^2$, secured to the shafts $c^2$, and the latter carry the sprocket-drive chain-wheels L. Vertical shafts $c^3$ are eccentrically secured in the bushing $c^{12}$, which can turn in the bearings $c^{13}$. The said shafts constitute axles for the idler chain-wheels L', which can thereby be made to approach or recede from each other, and consequently the distance between the forming-chains can be varied. Forming-chains $c^4$ operate under the hopper $a^4$ and encircle the sprocket chain-wheels L L'. They consist of the hinged blocks $c^{14}$, concaved on their outer faces, as shown at $L^3$, and are guided to remain in gear with chain-wheels by the guards $L^4$. Guides $l$ for the forming-chains are pivoted to the cross-brace $i$ by means of pivots $i^2$, and they pass over the cross-brace $i'$, being connected by the tie $i^4$, in which there are a number of holes $i^3$, through which screws secure the tie $i^4$ to the guides $l$ in different positions, and consequently the said guides may be made to approach or recede from each other. Shafts $c^7$ are eccentrically secured to bushings $c^{18}$, which carry the cams $c^5$ and $c^6$, that impinge against the cross-braces $c^8$ $c^9$ of the machine. The shafts $c^7$ terminate in squared ends $c^{10}$, suitable for wrenches. Screws $c^{16}$ and $c^{17}$, threaded in the frame of the machine, sustain the ends of the cross-braces $c^8$ $c^9$ against the cams $c^5$ and $c^6$. Under the forming-chains $c^4$ there passes an endless-belt conveyer M, which I will term the "forming-chain" conveyer. It is driven by the pulley C and turns over the idler N, a support $N^2$ supporting the upper span of the belt.

A frame N′, consisting of the sides $n^2$, cross-tie $n'$, and axle $n^3$, with roller $n^5$, is supported on the cross-shaft $b^{12}$ by means of notches $n^6$ in the sides $n^2$, and a weight $n^4$ on the outward end of the said frame forces the roller $n^5$ to tighten the belt M between the pulleys N and C.

I will now consider the actuating mechanism for the paper wrapper of the cigarette, and, referring again to Figs. 1 to 9, a reel Q is journaled in brackets $q$ at the bottom of the frame of the machine. Motion is transmitted from the main shaft B B to the bevel-wheel $f^5$, and it will be noted that the said wheel is loose on its shaft $f^4$, which turns in the bearing $f^8$; but a ratchet $f^6$ is keyed to the said shaft, and a pawl $f^{10}$, with its spring $f^{11}$, is secured to the wheel $f^5$.

It will be evident that when the bevel-pinion $f^3$ transmits its motion to the wheel $f^5$ the latter transmits the said motion to the shaft $f^4$ through the pawl $f^{10}$ and ratchet $f^6$, and should it be desired to turn the shaft $f^4$ independently of the rest of the mechanism the operator has only to turn the said shaft by means of the handle of the wheel $f^{12}$.

The driving-wheel $g$ is secured to the shaft $f^4$, and the conveyer $g'$, which I will term the "forming-tube" conveyer, extends from said wheel to and over a pulley $Y^4$. A belt-tightener is supported on the shaft $f^4$ and consists of the roller $g^6$, journaled in the arm $g^7$, extending from the lever $g^2$, which carries a pawl $g^3$, arranged to engage with the segment $g^4$, that extends from the frame of the machine. It will be evident that the roller $g^6$, pressing up against the belt $g'$, tightens the same and that by securing the lever $g^2$ in different positions the tension of the conveyer $g'$ can be varied by reason of the roller $g^6$ exerting more or less pressure against the said conveyer $g$. A roller $g^8$, generally covered with rubber, is supported on a lever $g^9$, swinging on a journal-pin $g^{10}$, and a weight $g^{11}$ presses the roller against the under side of the belt $g'$ of the driving-pulley $g$. A hood $L^2$, with tapering crown and sides, extends between the forming-chains $c^4$ over the pulley N and connects with a half-round bridge-piece O. A cross-brace Y Y′, carried on the frame, Figs. 8, 9, and 16 to 27, supports one end of the cigarette-forming tube P and the mechanism for controlling the paper wrapper and the cigarette-forming-tube conveyer. The details of the said cross-brace and controlling apparatus are shown in the drawings as follows:

Figs. 28 and 29 are, respectively, an end view and a plan of Fig. 27.

The cross-brace comprises the members Y Y′, joined by the connecting-piece $Y^2$ with the screws $y'$. A depression $y^2$, formed in the piece $Y^2$, secures a good support for the cigarette-forming tube P. Arms $Y^3$ extend from the piece $Y^2$ and terminate in bosses $Y^{11}$, into which is fastened the shaft $y$ for carrying the roller $Y^4$. Pins $Y^{29}$ pass through the said shaft and the bosses $Y^{11}$. A sliding bar $Y^5$ moves over the connecting-piece $Y^2$, being guided in proper operative positions by means of the screws $y^{19}$, which pass through slots $y^7$ and are secured into the connecting-piece $Y^2$. An arm $y^6$ extends from $Y^5$ and is tapped for a screw $y^{21}$, which is held longitudinally by the bearing $y^4$, projecting from the support Y between the head $y^{22}$ and collar $y^{23}$ on the said screw. The bar $Y^5$ carries the wings or guides $Y^6 Y^7$, partially surrounding the roller $Y^4$ and which have lugs $y^8 y^9$, the latter being pierced with the slots $y^{10}$ and the former with holes for the screws $y^{18}$. Against the ends and under the arms $Y^3$ of the bosses $Y^{11}$ there is located the bottom slide $Y^8$, consisting of the end portion $y^{11}$, bottom portion $y^{13}$, which swells to the curved portion $y^{28}$ in the center and is guided in operative position by means of screws $y^{26}$, which pass through the slotted holes $y^{16}$ and $y^{17}$ and are fastened into the arms $Y^3$ of the bosses $Y^{11}$. Wings or guides $Y^9 Y^{10}$ are bolted to the portion $y^{13}$. The wing $Y^9$ contains slots $y^{30}$ for the bolts $y^{14}$, which are secured into the portion $y^{13}$, and the wing or guide $Y^{10}$ is secured to the piece $y^{13}$ with the bolts $y^{15}$.

Figure 1:
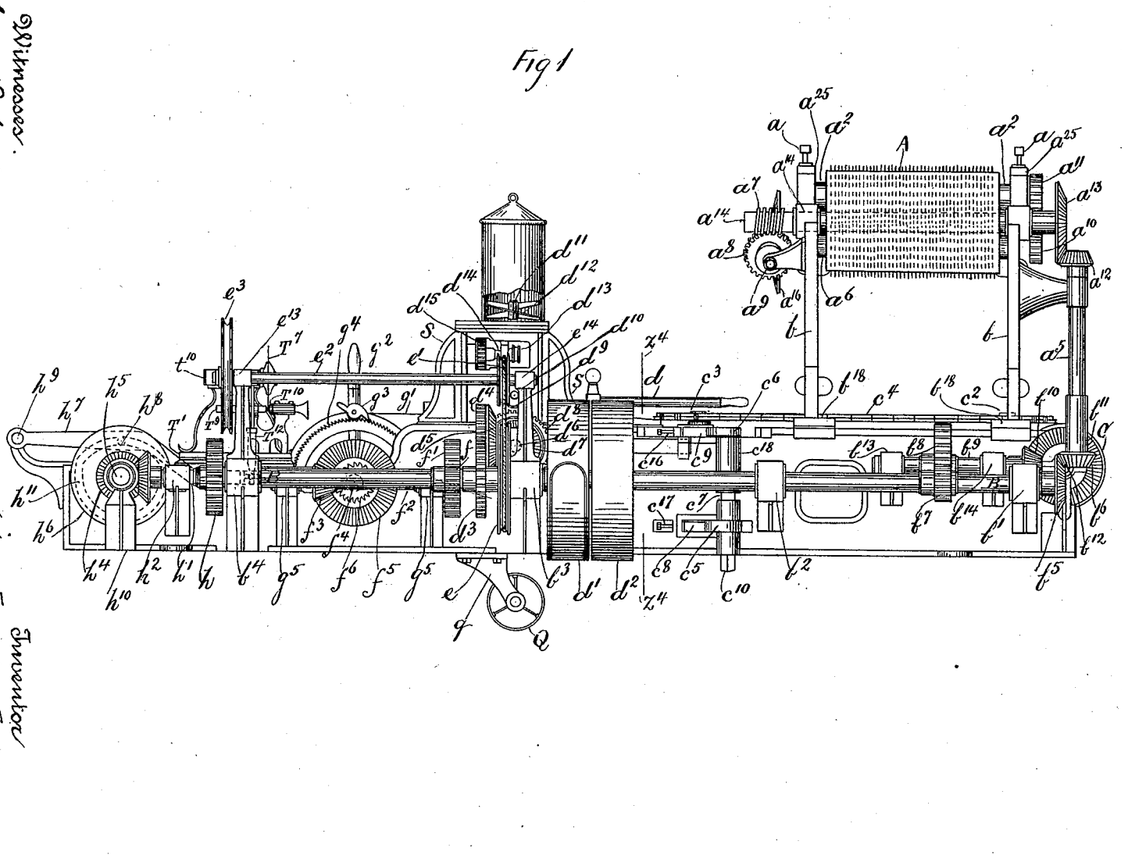
Figure 1 represents an elevation of the cigarette-making machine with the front of the hopper removed.
Figures 2, 3, 4, 5, 6:
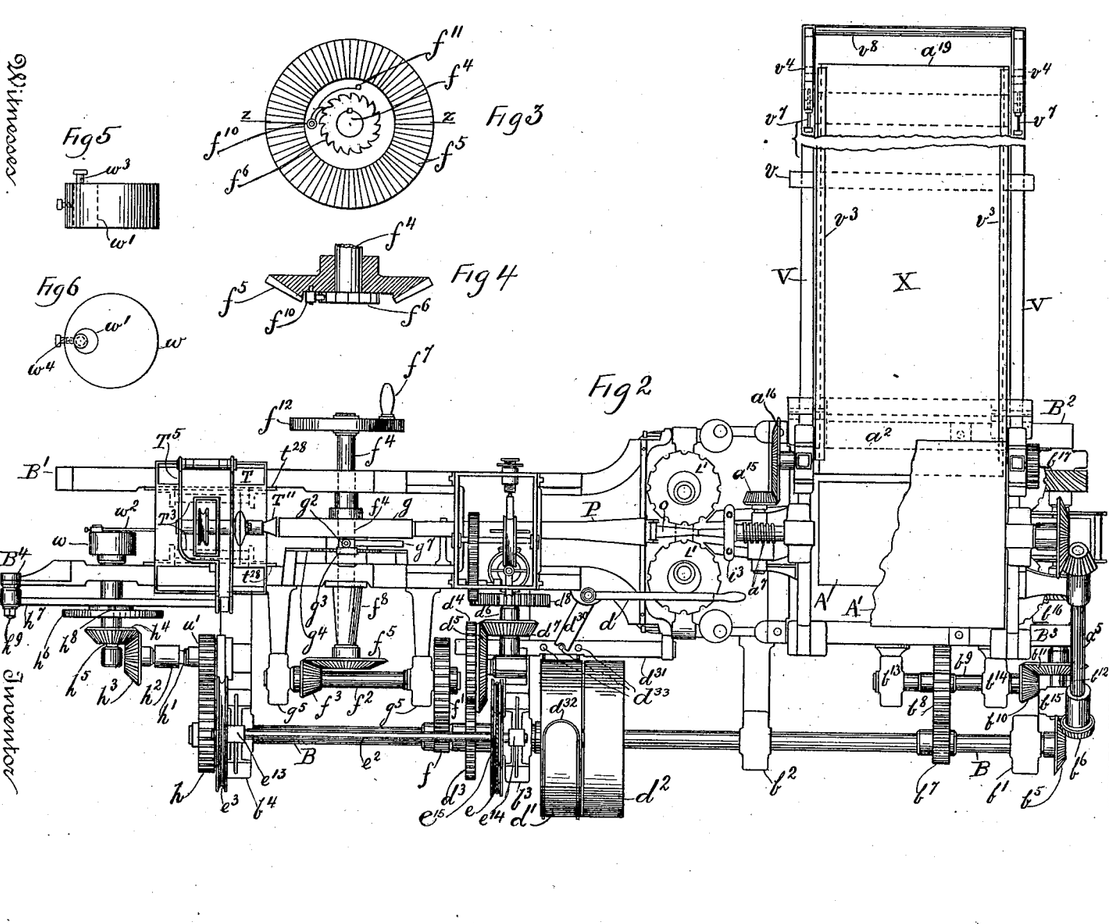
Fig. 2 shows a plan of Fig. 1.
Fig. 3 represents a plan of the bevel-gear for actuating the tobacco-tube conveyer.
Fig. 4 is a section of Fig. 3 on the line $z\ z$.
Fig. 5 shows a top view of the disk of the disk-crank for knife-carriage on an enlarged scale.
Fig. 6 represents a plan view of Fig. 5.
Figure 7:
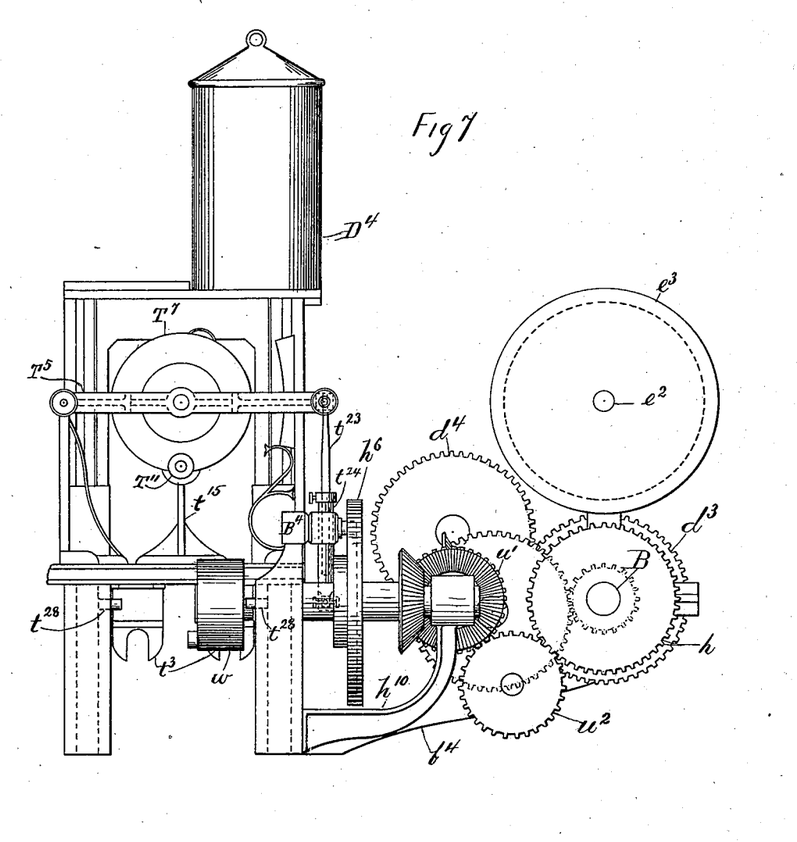
Fig. 7 is an end view of the cigarette-making machine adjacent to knife-carriage on an enlarged scale.
Figure 8:
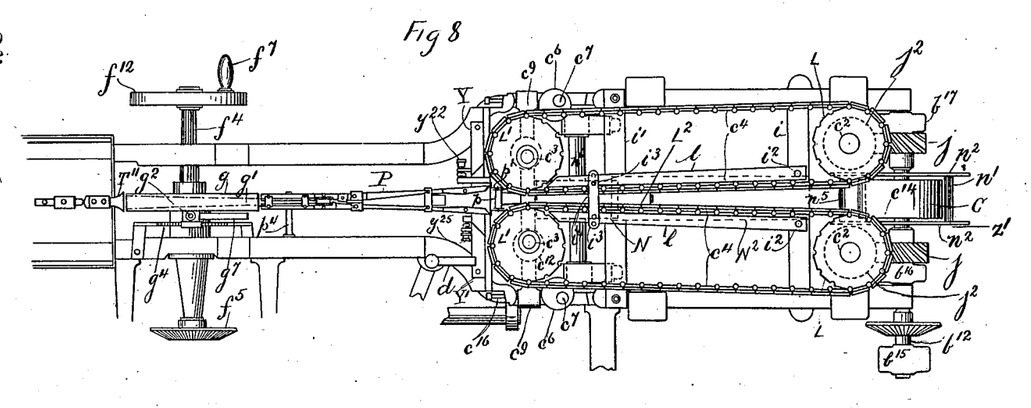
Fig. 8 shows a partial plan view of the machine with the hopper removed.
Figure 9:
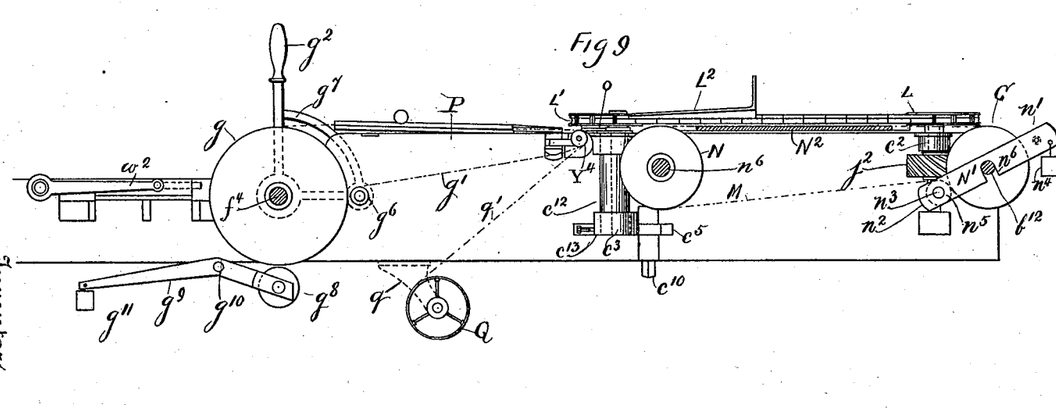
Fig. 9 represents a section of Fig. 8 on the line $z'$.
Figure 50:
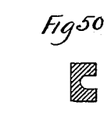
Fig. 50 shows a section of Fig. 49 on the line $z^{11}\ z^{11}$.
Figure 51:
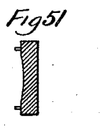
Fig. 51 is a section of Fig. 49 on the line $z^{12}\ z^{12}$.
Figure 52:
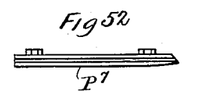
Fig. 52 represents an elevation of tube-cover at the exit end.
Figure 53:
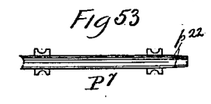
Fig. 53 is a bottom plan view of Fig. 52.
Figure 54:
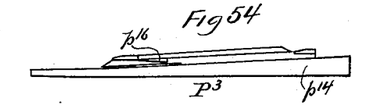
Fig. 54 shows an elevation of the middle cover of the tube.
Figure 55:
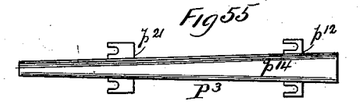
Fig. 55 is a bottom plan view of Fig. 54.
Figure 59:
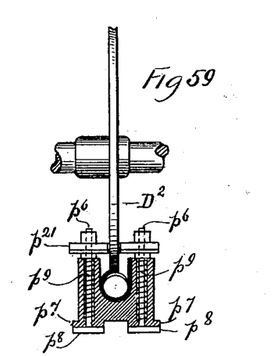
Fig. 59 shows a section of Fig. 46 on the line $x^2\ x^2$, representing the paper wrapper and conductor on the outside thereof.
Figure 60:
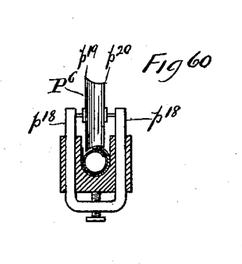
Fig. 60 represents a section of Fig. 46 on the line $x^3\ x^3$, showing the edges of the paper being gummed together with the conductor on the outside.
Figure 61:
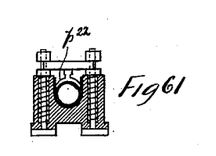
Fig. 61 shows a section of Fig. 46 on the line $x^4 x^4$.

It will be evident from an inspection of Fig. 9 that the tube-conveyer $g'$ will draw upon it the cigarette-wrapper $q'$ and lead it with the tobacco cord from the bridge-piece $o$ to the funnel $T^{11}$, leading to the guide-tube under the knife. This cigarette-forming tube P, with its appurtenances, is shown in position in Figs. 1, 2, 8, and 9, and the details are represented in Figs. 45 to 61. It comprises the body or main portion P′, which is concaved to conform to a semicircle from one end, as $p^2$, to a point $x$, when it gradually widens and flattens to the other end $p^3$, the sections in Figs. 50 and 51 showing the same. At the end $p^3$ two covers $P^2$, somewhat concaved on their inside faces, are secured by means of pins $p^4$ and screws $p^5$. Guide-covers $P^3$ are secured with bolts $p^6$, which pass through the body P′ and through bosses $p^7$. Heads $p^8$ of the bolts extend beneath the bosses, and springs $p^9$ surround the bolts $p^6$ and bear between the nuts $p^{10}$ on the bolts and the bosses $p^7$. Cross-braces $p^{12} p^{21}$, with slots $p^{13}$ for the bolts $p^6$, extend from the cover $P^3$, and the nuts $p^{10} p^{11}$, bearing against the said braces, secure the cover $P^3$ in different operative positions. The main portion $p^{14}$ of the cover $P^3$ is concaved to the form of a semicircle and terminates in edges $p^{15}$, with a wing $p^{16}$ on one side, which turns down the paper wrapper and holds the same between the said wing and the curved portion $p^{14}$. The cross-brace $p^{21}$ is slotted at $p^{22}$ for the introduction of the gumming-wheel $D^2$, so that the same may gum the edges of the wrapper, as shown in Fig. 59. Guides $P^4$ $P^5$, with their bottom sides concaved, are dovetailed into the main portion $P'$ and screws $p^{17}$ secure them in various lateral positions. A compressing-wheel $P^6$ is journaled in the adjustable forked legs $p^{18}$, and the circumference of the said wheel is concaved to obtain one side $p^{19}$ of larger diameter than its opposite side $p^{20}$, the effect of which is to separate the cigarette-tube conveyer from the cigarette-wrapper.

$P^7$ shows the adjustable cover at the exit end of the cigarette-forming tube, and it is secured to the same in a similar manner as described for the cover $P^3$. It terminates in the concaved arms $p^{22}$, which bring the final pressure on the gummed wrapper as it leaves the cigarette-forming tube.

I will now explain the gum-pot, with its appurtenances, Figs. 1, 2, 7, and 30 to 36, and, as already stated, motion is transmitted from the spur-gear $d^3$ on the main driving-shaft through the train of gearing to the bevel-pinion $d^7$, which is secured to the shaft $d^6$, on which there is also fastened the gear $d^8$, the latter meshing with the spur-gear $d^9$, carried on the shaft $d^{10}$, which is supported in journals $D^{14}$ and $D^3$ on an independent and movable frame D of the gumming device. The bearing $D^3$ consists of a screw which can be locked to the frame by means of the nut $d^{27}$. The shaft $d^{10}$ carries the bevel-pinion $d^{16}$ and the gumming-wheel $D^2$. The beveled pinion $d^{16}$ gears with the bevel-wheel $d^{17}$, secured to the shaft $d^{11}$, on which is fastened the propeller-wheel $d^{12}$. On the shaft $d^{11}$ there is formed a worm $d^{18}$, which actuates the worm-wheel $d^{13}$ on the shaft $d^{14}$, and the latter carries the spur-gear $d^{15}$, which drives the gear $d^{19}$ on the shaft $d^{20}$, on which shaft there is secured the concaved gum-conveying wheel $D'$. The periphery of the gumming-wheel $D^2$ is adjacent to the periphery of the wheel $D'$, the distance between the wheels being adjusted by securing the wheel $D^2$ in different operative positions on the shaft $d^{10}$. A wiper $D^{10}$ incases both the wheels $D'$ and $D^2$. The wheel $D'$ has actuating thereon a doctor $d^{23}$, which is hinged at the lower end of the duct $d^{24}$, the latter piercing the cover $D^{12}$ and leading from the inside of the gum-pot $D^4$. The said doctor is adjusted by a screw $d^{25}$ between the walls $d^{26}$, which, with the end piece $d^{28}$, constitute a box for the doctor.

Figures 30, 31, 32, 33, 34, 35, 36:
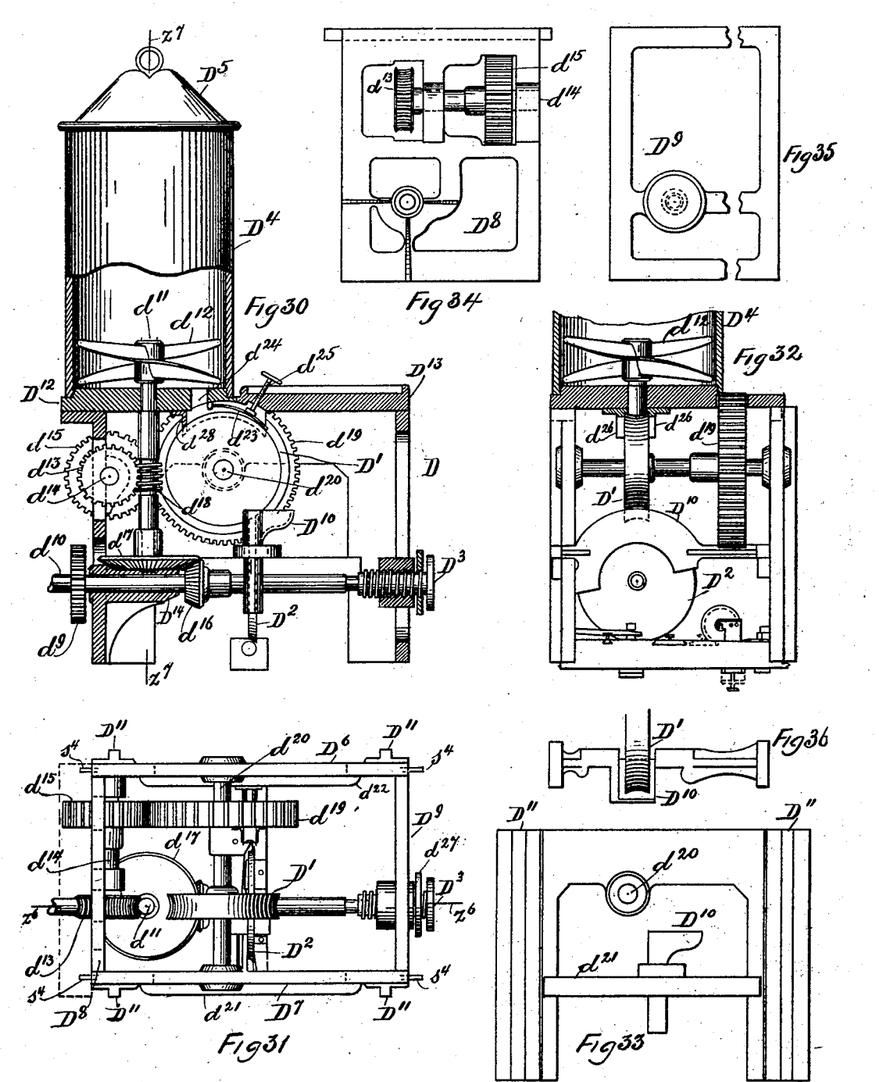
Fig. 30 represents a partial section of the gumming device on line $z^6\ z^6$ of Fig. 31.
Fig. 31 is a top view of Fig. 30 with the cover removed.
Fig. 32 shows a partial section on the line $z^7\ z^7$ of Fig. 30.
Fig. 33 shows an elevation of one of the side legs of the gumming device.
Figs. 34 and 35 are elevations of the end legs of the gumming device.
Fig. 36 shows a plan of the wiper.
Figure 37:
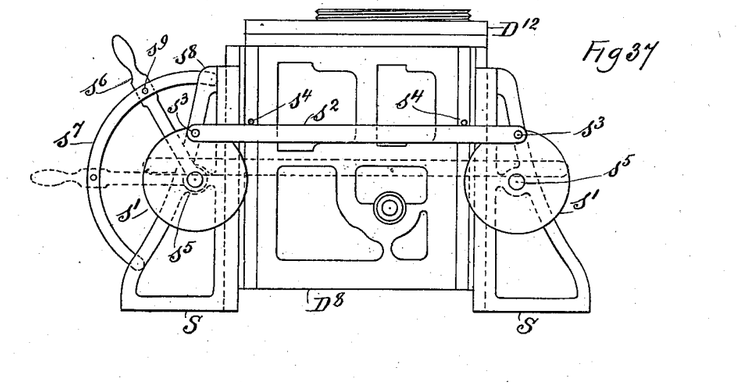
Fig. 37 represents an elevation of the gumming-table with its raising and lowering mechanism.
Figure 38:
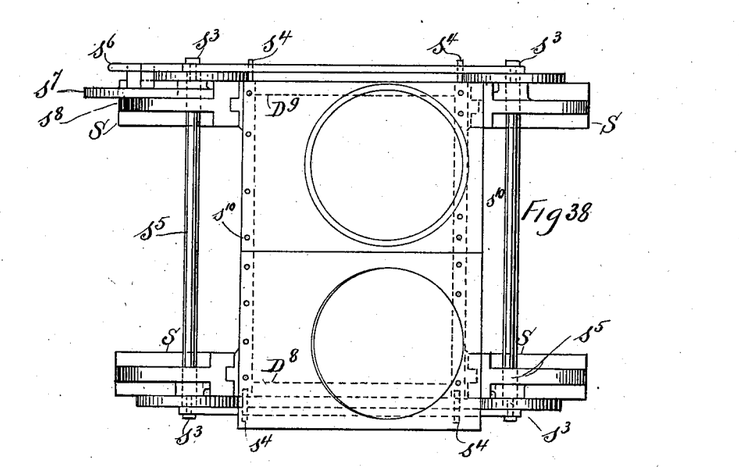
Fig. 38 is a top view of Fig. 37.
Figures 39, 40:
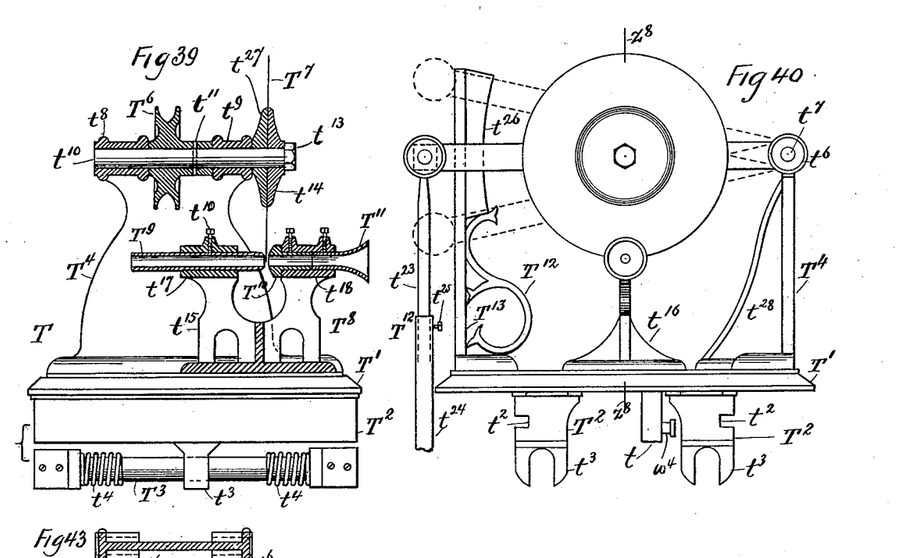
Fig. 39 shows a partial section through knife-carriage on the line $z^8\ z^8$ of Fig. 40.
Fig. 40 is a side view of Fig. 39.
Figures 41, 43, 44:
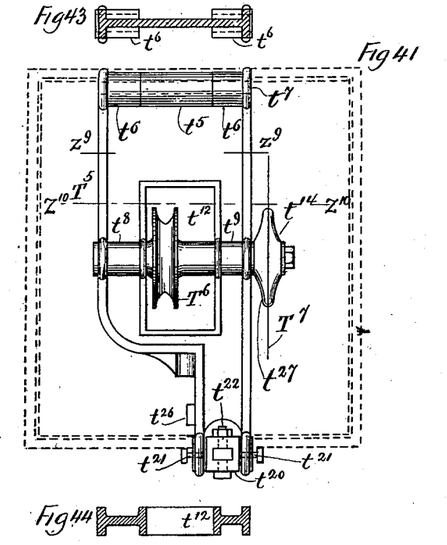
Fig. 41 represents a plan of knife-frame with its knife-blade.
Fig. 43 is a section of Fig. 41 on the line $z^9\ z^9$.
Fig. 44 represents a partial section of Fig. 41 on the line $z^{10}\ z^{10}$.
Figure 42:
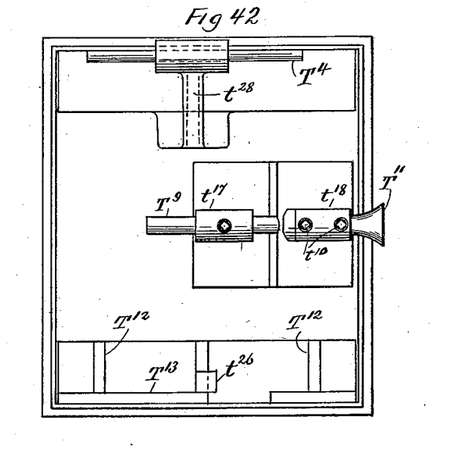
Fig. 42 shows a plan of the carriage-table.
Figure 45:
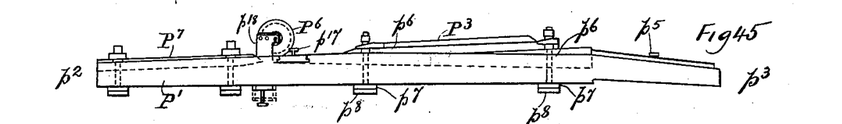
Fig. 45 is an elevation of the cigarette-forming tube.
Figures 46, 47, 48:
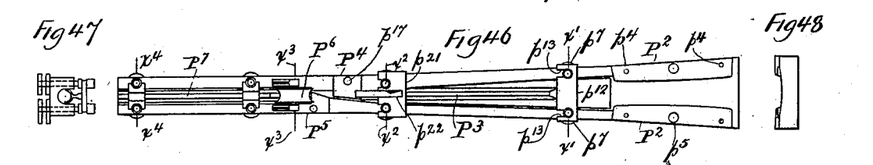
Fig. 46 is a top view of Fig. 45.
Figs. 47 and 48 are end views of the cigarette-tube.
Figure 49:
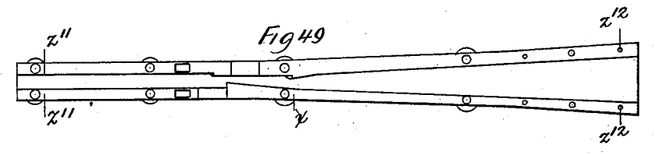
Fig. 49 shows a plan of the tube without its appurtenances.

The gum-pot $D^4$, with its removable cover $D^5$, is secured to the top of the adjustable table $D^{12} D^{13}$, which is bolted on the sides $D^6 D^7$ and ends $D^8 D^9$ with the screws $s^{10}$. The said top is made in two portions $D^{12} D^{13}$, as shown in Figs. 30 and 38, so that the portion $D^{13}$ may be easily removed. Projecting strips $D^{11}$ are fastened to the sides $D^6 D^7$, which actuate in guide-brackets S, Figs. 1, 2, 37, 38, carried on the frame of the cigarette-machine. Disk cranks $s'$ are journaled to the brackets S, and lifting-bars $s^2$ are pinned to the said disks with the journal-pins $s^3$. Pins $s^4$, which are engaged by the lifting-bars, project from the ends $D^8 D^9$ of the gum-pot table. A lever $s^6$ is fastened to one of the axles $s^5$ and operates along the sector $s^7$, which is fastened to a rib $s^8$ of one of the brackets S.

I will now describe the circular cutter, Figs. 1, 2, 7, and 39 to 44, with its appurtenances. It has already been noted that the spur-gear $h$ on the driving-shaft B B, through its train of gearing, turns the shaft $h^5$, which latter carries a crank-disk $w$, Figs. 5 and 6, into which is fitted a bushing $w'$, with the pin $w^3$ eccentrically located thereon, a set-screw $w^4$ holding the spindle in proper operative positions, thereby enabling the radius of the crank to be varied. A connecting-rod $w^2$ is journaled on the pin $w^3$ and on the pin $w^4$ of the lug $t$, Fig. 40, on the knife-carriage T. The said carriage consists of the table $T'$, from which extend the legs $T^2$, with grooves $t^2$, which actuate over guides $t^{28}$ on the frame of the machine. Forks $t^3$ project from the legs $T^2$, which actuate over the guides $T^3$, also fastened to the frame of the machine. Springs $t^4$ on the guides $T^3$ prevent jar when the forked ends strike them as the carriage reciprocates. The table T carries the upright $T^4$, which supports a boss $t^5$, and an upright $T^{13}$ supports a segment $t^{26}$. A swinging frame $T^5$, with bearings $t^6$, is hinged to the boss $t^5$ of the upright $T^{14}$ by means of a journal-pin $t^7$. The frame $T^5$ contains an opening $t^{12}$, on two opposite sides of which are formed bearings $t^8 t^9$ for the axle $t^{10}$, to which is secured the wheel $T^6$ by means of the pin $t^{11}$. A collar $t^{27}$ is fastened on the shaft $t^{10}$, against which there is clamped the circular cutter or knife $T^7$, by means of the loose collar $t^{14}$ and nut $t^{13}$. A frame $T^8$, comprising the vertical members $t^{15} t^{16}$, carries the bearings $t^{17}$ and $t^{18}$ for the cigarette-guide tubes $T^9 T^{10}$ and funnel $T^{11}$, which are held in the said bearings with the set-screws $t^{10}$. From the frame $T^5$ extends a universal joint, which comprises a body $t^{20}$, swinging on pins $t^{21}$, and a connecting-rod $T^{12}$ swings on a pin $t^{22}$, supported in the said body $t^{20}$ of the universal joint. The connecting-rod $T^{12}$ consists of the shaft $t^{23}$, adjustable in the sleeve $t^{24}$, in which it is clamped in proper position by the screw $t^{25}$. Journal-bearings $e^{13}$ and $e^{14}$ extend above the bearings $b^4$ and $b^3$, and they support the shaft $e^2$, which carries the grooved wheels $e^3$ and $e'$, the latter being connected by a belt or cord $e^{15}$ with a grooved wheel $e$ on the main driving-shaft B B, and the wheel $e^3$ is connected by a belt or cord with the grooved wheel $T^6$ on the axle $t^{10}$, which latter carries the circular cutter or knife $T^7$. At one end of the frame there is formed a boss $B^4$, from which there projects the journal-pin $h^9$, that supports the swinging lever $h^7$, carrying the roller $h^8$, the latter actuating in the groove $h^{11}$ of the wheel $h^6$, thereby constituting a grooved disk cam, and it will be noted that the roller $h$, by reason of the weight of the swinging lever $h^7$ and swinging frame $T^5$, always bears on the same face of the groove, thereby avoiding any intermittent action on the knife-carriage. A universal joint at the end of the said lever carries the rod $T^{12}$, which connects with the swinging frame $T^5$, carrying the knife or circular cutter. The relative diameters of the gears $h$ and $u'$ are varied to change the speed of the knife-carriage T, and the stroke of the said carriage can be changed by securing the bushing $w'$ in different positions in the crank-disk $w$, and thereby cut the cigarette-cord in various lengths. It will be seen that the carriage is automatically reciprocated to allow the knife to cut the cigarette-cord in planes at right angles to its longitudinal axis while it is issuing from the end of the guide-tube $T^9$.

In describing the operation of this machine, which has a capacity varying from one hundred to about one hundred and twenty thousand cigarettes per day, I will follow the different operations from the introduction of the tobacco to the finished cigarette.

Figure 56:
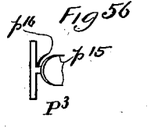
Fig. 56 shows an end view of Fig. 55.
Figure 57:
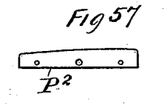
Fig. 57 represents a plan view of the cover of the cigarette-tube at entering end.
Figure 58:
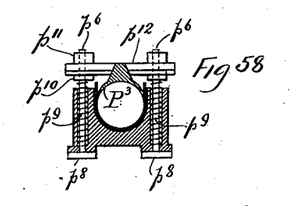
Fig. 58 shows a section of Fig. 46 on the line $x'\ x'$, showing the paper wrapper and the conductor on the outside thereof.

To start the machine, the operator throws in gear the tight pulley of the pair designated by $d'$ $d^2$ on the shaft B B, by which all the moving mechanisms of the invention are put in action. Tobacco is then spread upon the feed-conveyer X, which takes it to the feeding-roller $a^2$, where it is pinched, compressed, and directed to the picker or distributing drum A. The distance between the rollers $a^2$ $a^6$ can be varied by adjusting the position of the bearings $a^{22}$, Fig. 13, it being at the same time necessary to substitute different spur-gears for the wheels $a^{10}$ and $a^{11}$. The tobacco is picked up uniformly by the teeth $a^{26}$ of the drum A, which, disentangled and dropped as the drum revolves on the sides $a^{20}$ $a^{21}$ of the hopper, is led upon the conveyer M and between the forming-chains $c^4$, and they simultaneously act on the tobacco, the forming-chains compressing and propelling it and the conveyer assisting in the said propulsion, forming the tobacco into a cord traveling toward the cigarette-forming tube P. The distance between the guides $l$ can be varied, as also the distance between the idlers L', and the tension on each forming-chain is adjusted by means of the cams $c^5$ $c^6$ bearing against the cross-braces $c^8$ and $c^9$. The tobacco as it travels from the wheels L to the wheels L', between the concaved internal surfaces of the blocks $c^{14}$ of the forming-chains, is pressed into a cylindrical-shaped tube, as shown at $L^3$, Fig. 13. The idler-wheels L', turning outwardly, propel the tobacco cord on the bridge-piece $o$, after which it is taken up by the paper wrapper $q'$, the latter being carried on the cigarette-forming-tube conveyer $g'$ through the said tube, both being driven by the wheel $g$ and the roller $Y^4$. The screw $y^{22}$ adjusts the lateral direction of the paper wrapper, and the screw $y^{25}$ adjusts the direction of the tube-conveyer $g'$ upon entering the cigarette-forming tube P. As the paper wrapper $g'$, with its tobacco cord, enters the cigarette-forming tube P the wings $P^2$, Fig. 46, start them centrally through it, and the converging form of the tube gradually reduces the size of the wrapper and tobacco cord, so that they can freely pass the smallest portion of the same. The edges of the paper wrapper are curved up on both sides by the ends $p^{15}$ of the adjustable cover $P^3$, and the wing $p^{16}$, meeting the turned-up edge of the wrapper, turns it down in proper position for the application of gum from the gumming-wheel, as shown in Fig. 59, the said wing keeping the edge of the paper between itself and the side of the cover $p^{14}$, as shown in Fig. 56. The springs on the screws $p^6$, with the nuts on the said screws, allow adjustment between the cover $P^3$ and the body $P'$ of the forming-tube, thereby allowing the tobacco cord to be formed of a predetermined diameter. The wrapper, with its tobacco cord, is next acted upon by the adjustable guide-cover $P^4$, which compels the gummed edge of the paper wrapper to envelop the tobacco cord, after which the opposite adjustable cover $P^5$ forces the other edge of the paper cover or wrapper to overlap the gummed end. The paper wrapper now completely enveloping the tobacco cord passes under the adjustable grooved wheel $P^6$, which presses the gummed portions of the paper together. The cigarette-tube conveyer while passing under the said wheel is turned up on one side by reason of one edge of its periphery being of larger diameter than the other, thereby separating it from the paper-covered tobacco cord after it has been gummed, Fig. 60. The cigarette-tube before leaving the forming-tube passes under the adjustable concaved cover $P^7$, Figs. 52, 53, which completely separates the conveyer and the cigarette-cord, because as the conveyer, with the cigarette-cord, endeavors to pass under the cover $P^7$ the ends $p^{22}$ of the latter are forced between the said cord and cover. The cigarette-cord then enters the funnel $T^{11}$ leading to the guide-tube $T^{10}$, Fig. 39, during which time the paste dries, and then the cutter $T^7$ cuts the cigarette-cord into cigarettes of appropriate length, which pass into and through the tube $T^9$, from which they are deposited a finished article.

I will now particularly consider the operation of the gumming device, (see Figs. 1, 2, 30 to 36,) the mechanism of which receives its motion from the main shaft B B, as already explained, and when the propeller-wheel $d^{12}$ is turning, which amounts to approximately seven hundred revolutions a minute, it beats the paste in the gum-pot $D^4$ and causes it to issue in a uniform consistency from the opening $d^{24}$. The gum is forced through the valve-box and issues at the opening between the valve $d^{23}$ and the wheel D', the said opening being controlled by the screw $d^{25}$. The gum-conveying wheel D' delivers the gum to the gumming-wheel D², the latter revolving faster than the wheel D', and the wiper D¹⁰ prevents any overcharge of paste adhering to the sides of the wheels. The gum-pot table actuates in guide-brackets S, Fig. 37, and is raised or lowered by means of the handle s⁶, allowing easy inspection of the running-gear of the gumming device while the machine is in operation. The cover of the paste-pot can be removed and the paste replenished.

I will now particularly describe the operations of the severing mechanism. The counter-shaft e², Figs. 1, 2, 39 to 44, as already explained, receives its motion from the main shaft B B. The wheel e³ on the said shaft by means of a cord drives the wheel T⁶ on the knife-shaft, by virtue of which the knife-blade T⁷ is turned. The spur-gear h transmits its motion to the shaft h⁵ by the interposed gearing, and the connecting-rod w² transmits a reciprocating motion to the carriage T. The strokes of the carriage can be adjusted by the bushing w', with its eccentrically-located wrist-pin w³, and its speed can be varied by changing the gears h u', thereby enabling cigarettes of different lengths to be cut. The lever h⁷, swinging on its pin h⁹, is raised and lowered by the action of the groove in the disk h⁶ on the roller h⁸. The lever raises and lowers the rod T¹², which latter communicates its motion to the swinging knife-frame T⁵. Thus while the carriage is reciprocating on the frame of the machine the knife is turning and at the same time is being raised and lowered, the combined action allowing the knife to cut the cigarette-cord at right angles to its longitudinal axis as it is traveling through the guide-tubes T¹⁰ and T⁹.

Having described my invention, I desire to secure by United States Letters Patent and claim—

1. In a cigarette-making machine the combination of a distributing-drum, a hopper below said drum, forming-chains operating at the bottom of the hopper, means to adjust the tension of the forming-chains, means to vary the distance between the forming-chains, a conveyer under the forming-chains, and means to actuate the moving elements.

2. In a cigarette-making machine, the combination of a distributing-drum, a hopper below said drum, forming-chains operating at the bottom of hopper, means to adjust the tension of the forming-chains, means to vary the distance between the forming-chains, adjustable guides on the outside of the forming-chains, a conveyer under the forming-chains, and means to actuate the operating elements.

3. In a cigarette-making machine, the combination of a hopper, a distributing-drum with the said hopper, forming-chains at the bottom of the hopper, means to adjust the tension of the forming-chains, means to vary the distance between the forming-chains, driving-wheels and adjustable idler-wheels for the forming-chains, and means to actuate the operating elements.

4. In a cigarette-making machine, the combination of a hopper, a distributing-drum journaled over the said hopper, forming-chains with their outside faces concaved operating at the bottom of the hopper, means to adjust the tension of the forming-chains, means to vary the distance between the forming-chains, driving-wheels and adjustable idler-wheels, for the forming-chains, and means to actuate the moving elements.

5. In a cigarette-making machine, the combination of a hopper, a distributing-drum over the hopper, forming-chains at the bottom of the hopper, means to adjust the tension of the forming-chains, a driving and an idler wheel for each forming-chain, bearings on the machine, bushings turning in the said bearings, vertical shafts eccentrically secured in the bushings, and the said idler-wheels turning on the said shafts, and means to actuate the moving elements.

6. In a cigarette-making machine, the combination of a pair of driving-wheels, and a pair of idler-wheels, endless forming-chains each encircling and connecting one of the driving-wheels with one of the idler-wheels, means to adjust the tension of the said chains, means to vary the distance between the forming-chains, adjustable journal-pins for the idler-wheels, adjustable guides bearing against the chains, each longitudinal with the peripheries of a driving and an idler wheel, and located where the peripheries of the drivers are adjacent, and where the idlers are adjacent.

7. In a cigarette-making machine the combination, of a pair of driving-wheels, and a pair of idler-wheels, endless forming-chains each encircling and connecting one of the driving-wheels with one of the idler-wheels, means to adjust the tension of the said chains, means to vary the distance between the forming-chains, guides pinned to the frame of the machine, one for each chain inside of the loop formed by each chain, and bearing each against one of the spans of each chain that are adjacent to each other, a bar spanning the walls of the frame of the machine, and the adjustable ends of the aforesaid guides secured thereon.

8. In a cigarette-making machine the combination, of a frame, adjustable cross-braces supported in the frame, bearings formed in the cross-braces, bushings fitting in the bearings, shafts carried eccentrically in the said bushings, idler sprocket chain-wheels fitting on the said shafts, sprocket-drive chain-wheels and shafts therefor mounted in the frame of the machine, forming-chains extending between each pair of driving and idler wheels, shafts with cams journaled in the frame, the cams bearing against the said cross-braces, and means to adjust the cams against the cross-braces.

9. In a cigarette-making machine, a distributing-drum, a hopper under the drum, an apron extending from the hopper, a feed-conveyer operating on the apron, a compressing-roller turning between the end of the feed-conveyer and the drum, in combination with forming-chains operating at the bottom of the hopper, a conveyer under the forming-chains, a hood between the chains and above the forming-chains conveyer, driving-wheels for the forming-chains, adjustable idler-wheels for the forming-chains, means to adjust the tension of the forming-chains, means to vary the distance between the forming-chains and means to actuate the moving elements.

10. The combination of a cigarette-forming tube, a conveyer traveling therein and supporting the wrapper for the cigarette-cord, adjustable guides at one end of the forming-tube to lead the conveyer with the wrapper through the tube, a driving-wheel for the conveyer located at the end of the forming-tube opposite to the said adjustable guides, a lever extending from the shaft of the driving-pulley, a roller journaled in the lever and pressing against the conveyer, and means to regulate the pressure between the said roller and conveyer, a swinging lever below the said driving-wheel for the conveyer, a roller journaled in one end of the swinging lever and a weight attached to the other end of the same, the roller bearing against the conveyer at the lower portion of the driving-wheel.

11. In a cigarette-making machine, a frame, a support secured on the frame, a roller journaled on the support, a top sliding frame on the support, a pin turning in a bearing on the support but longitudinally stationary thereto, a screw extending from the said pin and fitting a thread in the top sliding frame, adjustable guides carried on the top sliding frame and partially surrounding the roller, in combination with a second movable frame adjacent and under the support, a second pin turning in a bearing on the support, a screw extending from the second pin and fitting into a threaded hole on the second sliding frame, a pair of guides on the second sliding frame, and one of said pair of guides adjustable on its frame.

12. In a cigarette-making machine, the combination of a cigarette-forming tube, a conveyer traveling in the tube, a driving-wheel for the conveyer, a shaft carrying the said driving-wheel, a gear-wheel supported on but not secured to the said shaft, a ratchet fastened to the shaft, a pawl pinned to the gear-wheel and formed to engage the said ratchet, a hand-wheel fastened to the shaft, and means to turn the driving-wheel.

13. In a cigarette-making machine the combination of a frame, a cigarette-forming tube mounted thereon, a driving-shaft at one end and below the tube, a driving-wheel on the shaft, a roller at the opposite end of the tube, a conveyer extending around the wheel and the roller and through the tube, a belt-tightener for the conveyer extending from the shaft, a lever with counterweight journaled to the frame with a second roller bearing against the conveyer on the bottom of driving-wheel, a main driving-shaft on the cigarette-machine, means to turn the conveyer-driving-wheel shaft from the main driving-shaft, a hand-wheel on the conveyer-driving-wheel shaft, a pawl and ratchet interposed between the conveyer-driving-wheel shaft and the gear thereon, a hand-wheel on the said conveyer-driving-wheel shaft, to turn the same independently of the main driving-shaft.

14. In a cigarette-making machine the combination of a frame, a cigarette-forming tube mounted on the frame, a central longitudinal channel extending from the top face of the said tube, the channel tapering from one end to about its middle, entering wings partially covering the channel at its wide end, a cover with its concaved wings projecting into the central channel adjustably clamped to the tube and adjacent to the entering wings, slotted cross-braces extending from and near the ends of the said cover, bolts joining the body of the cigarette-forming tube and the cover, nuts on the bolts clamping the braces of the covers, springs bearing between the nuts and bosses on the bottom of the tube, a second wing extending above one of the said concaved wings, adjustable sliding covers dovetailed into the top faces of the tube and adjacent to the said adjustable cover, a wheel journaled in adjustable bearings over the tube and adjacent to the dovetailed wings, the circumferential surface of the wheel concaved and one side of said wheel of larger diameter than the other, a second adjustable cover adjacent to the said wheel, concaved wings on the second cover projecting into the channel of the tube, bolts joining the second cover and the tube, nuts on the bolts clamping the said second cover, springs on the bolts thereof bearing between bosses on the bottom of tube and the nuts on the bolts.

15. In a cigarette-making machine, the combination of a frame, guide-brackets on the frame, a gum-pot table fitting in the guide-brackets, means to raise and lower the table in the said brackets, a gum-pot mounted on the table, a propeller-wheel in the gum-pot, means to revolve the said propeller-wheel, a duct extending from the gum-pot, a gum-conveying wheel under the duct, an adjustable doctor hinged to the duct, a gumming-wheel adjacent to and at right angles to the gum-conveying wheel, means to actuate the propeller, gum-conveying, and gumming wheels.

16. In a cigarette-making machine, the combination of guide-brackets, a gum-pot table fitted in the brackets and adjustable therein, a gum-pot on the table, a propeller-wheel in the gum-pot, a duct leading from the gum-pot, a wheel under the duct, a second wheel with its periphery adjacent to the first wheel, means to raise and lower the gum-pot table, and means to actuate the propeller and the said wheels.

17. In a cigarette-making machine, the combination of guide-brackets, a gum-pot table sliding in the said guide-brackets, a gum-pot on the table, means to expel the gum from the gum-pot, pins projecting from the table, disk cranks journaled to the guide-brackets, lifting-bars pinned to the said disk cranks, an arm extending from a disk-crank shaft, a sector extending from one of the guide-brackets and securing the arm in various operative positions.

18. In a cigarette-making machine, the combination of a frame, guide-brackets supported on the frame, a gum-pot table guided by the said brackets and comprising side and end legs, a cover in two parts bolted to the legs, a gum-pot with a detachable hood secured to one of the parts of the cover, a shaft journaled to the end legs, a driving-gear on the shaft, a bevel-pinion on the shaft, a bevel-wheel meshing with the said pinion, a second shaft secured to the said bevel-wheel, a propeller-wheel on the second shaft and in the lower portion of the gum-pot, a worm formed on the second shaft, a worm-wheel meshing with the said worm, an axle supporting the worm-wheel, a pinion on worm-wheel axle, a spur-gear meshing with the said pinion, a second axle supporting the spur-gear and a gum-conveying wheel with a concaved periphery, a gumming-wheel on the driving-shaft of the gum-pot table the periphery of which is concaved and adjacent to the periphery of the gum-conveying wheel, a wiper partially incasing both of the said wheels, a duct in the cover of the table under the gum-pot, a box below said orifice, a doctor hinged therein, a screw extending from the doctor through the cover of the table, means to raise and lower the table with its appurtenances, and means to actuate the operating elements.

19. In a cigarette-making machine the combination of, a reciprocating knife-carriage, a swinging frame journaled to the carriage, a circular knife-blade journaled in the frame, a swinging lever journaled to the cigarette-machine, a rod connecting the end of the swinging lever and the swinging knife-frame, a grooved disk journaled on the machine, a roller extending from the swinging lever and projecting into the groove of the said disk and continuously bearing on the same face of the groove, and means to actuate the moving elements.

20. In a cigarette-making machine, a reciprocating knife-carriage, a frame journaled to the carriage, a circular knife-blade journaled to said frame, a lever pivoted to the frame of the cigarette-making machine, a grooved disk journaled in the frame of the machine, a roller on the said lever continuously bearing on the said face of the groove in the disk crank, a connecting-rod of variable length joining the said lever and the frame, journaled to the knife-carriage.

Signed at Havana, in the Province of Havana and Island of Cuba, this 4th day of October, A. D. 1901.

ANTONIO FERNANDEZ Y FERNANDEZ. [L. S.]

Witnesses:
    VICENTE VILLARUN, Jr.,
    MANUEL J. MARTINEZ.